United States Patent [19]

Morera et al.

[11] Patent Number: 5,394,441
[45] Date of Patent: Feb. 28, 1995

[54] METHOD AND APPARATUS FOR DIGITALLY TRACKING HIGHS AND LOWS OF A SIGNAL RECEIVED BY A RADIO COMMUNICATION DEVICE

[75] Inventors: Daniel A. Morera, Boynton Beach; David R. Petreye, Lake Worth, both of Fla.

[73] Assignee: Motorola, Inc., Schaumburg, Ill.

[21] Appl. No.: 13,855

[22] Filed: Feb. 5, 1993

[51] Int. Cl.6 ............... H04L 25/06; H04L 25/10
[52] U.S. Cl. ................... 375/327; 455/296; 340/825.44; 375/224; 327/58; 327/78
[58] Field of Search .............. 375/10, 76; 307/231, 307/351, 352, 353, 354; 370/13; 455/8, 296; 340/825.44

[56] References Cited

U.S. PATENT DOCUMENTS

| | | |
|---|---|---|
| 3,537,084 | 10/1970 | Behr . |
| 3,719,934 | 3/1973 | Behr et al. . |
| 3,736,582 | 5/1973 | Norris . |
| 4,631,737 | 12/1986 | Davis et al. . |
| 4,866,261 | 9/1989 | Pace . |
| 4,896,104 | 1/1990 | Patel et al. .................. 307/351 X |
| 4,929,851 | 5/1990 | Pace . |
| 5,025,251 | 6/1991 | Mittel et al. ................. 375/76 X |
| 5,097,486 | 3/1992 | Newby et al. ................. 375/76 |
| 5,121,411 | 6/1992 | Fluharty ....................... 375/76 X |
| 5,180,931 | 1/1993 | Harada ........................ 307/351 X |
| 5,303,416 | 4/1994 | Morera ......................... 455/296 |

Primary Examiner—Stephen Chin
Assistant Examiner—Bryan Webster
Attorney, Agent, or Firm—Kelly A. Gardner; John H. Moore

[57] ABSTRACT

A method for tracking a received signal comprises the steps of setting (635) a counter (130) to a first value indicative of a first signal voltage, determining a center threshold of the received signal, and determining a number of center transitions of the received signal within a predetermined time period. The method further comprises the step of automatically decrementing (685, 695) the counter (130) to a second value indicative of a second signal voltage in response to expiration of a predetermined amount of time, wherein the second value differs from the first value by a predetermined amount determined by the number of center transitions of the received signal within the predetermined time period.

11 Claims, 4 Drawing Sheets

METHOD AND APPARATUS FOR DIGITALLY TRACKING HIGHS AND LOWS OF A SIGNAL RECEIVED BY A RADIO COMMUNICATION DEVICE

FIELD OF THE INVENTION

This invention relates in general to radio communication devices, and more specifically to a method and apparatus for digitally tracking highs and lows of a radio frequency signal received by a radio communication device.

BACKGROUND OF THE INVENTION

Radio communication devices, such as pagers, typically receive and decode radio frequency (RF) signals to recover information contained therein. In many conventional radio communication devices, a received signal is first converted from the radio frequency at which it is received to baseband, subsequent to which data is recovered from the signal. The data is then processed by decoding circuitry, such as a microcomputer, which decodes the included information.

In order to recover the data from an incoming signal, tracking circuitry tracks the data to determine signal highs and lows, i.e., signal peaks and valleys. Once the incoming signal has stabilized and the highs and lows of the signal have been acquired, the highs and lows are utilized to generate from the incoming signal the stream of data.

In some conventional radio communication devices, the decay rate at which the signal can be tracked is determined by a capacitor included in analog tracking circuitry. Typically, the value of the capacitor is set such that the decay rate is relatively slow. The slow decay rate provides for the more accurate tracking of the signal because small signal deviations will not affect the highs and lows. However, the slow decay rate can sometimes cause problems. By way of example, when a noise spike occurs on the signal, the tracking circuitry follows the noise spike. Thereafter, a portion of the desired signal may be missed during the slow decay from the higher noise voltage to the lower signal voltage.

Other conventional radio communication devices digitally track an incoming signal at the direction of a controller, such as a microcomputer. Typically, this type of tracking circuitry holds the values of the most recent highs and lows of the signal, rather than automatically decaying like the above-described analog tracking circuitry, until directed by the microcomputer to decay, i.e., decrement counters to track a converging signal. In this manner, the digital tracking circuitry holds signal highs and lows, thereby preventing small signal deviations from affecting the highs and lows and thus the generated data. However, the microcomputer subroutines for directing the tracking circuitry generally consume space in the receiver memory that is already at a premium. Additionally, time is wasted in which the microcomputer must retrieve information from memory, process the information, and issue the appropriate instructions to the tracking circuitry.

Thus, what is needed is an improved method for tracking an incoming signal to acquire signal highs and lows that prevents situations in which portions of a desired signal are missed. The method should also prevent small deviations in the signal from affecting the signal highs and lows. Furthermore, implementation of the method should not require additional space in memory for storage of microcomputer subroutines or additional processing time in which the microcomputer generates commands to direct the tracking circuitry.

SUMMARY OF THE INVENTION

According to a first aspect of the invention, a method for tracking a received signal comprises the steps of setting a counter to a first value indicative of a first signal voltage, determining a center threshold of the received signal, and determining a number of center transitions of the received signal within a predetermined time period. The method further comprises the step of automatically decrementing the counter to a second value indicative of a second signal voltage in response to expiration of a predetermined amount of time, wherein the second value differs from the first value by a predetermined amount determined by the number of center transitions of the received signal within the predetermined time period.

According to a second aspect of the invention, a radio communication device for receiving and demodulating a radio frequency (RF) signal comprises tracking circuitry for tracking the signal to acquire values corresponding to peaks and valleys of the signal, the tracking circuitry comprising a peak counter for storing a peak value, a valley counter for storing a valley value, a controller coupled to and controlling the peak and valley counters, and a memory coupled to the controller for storing a time value associated with the predetermined amount of time. The radio communication device further comprises decay control circuitry coupled to the tracking circuitry for generating timing signals, wherein the tracking circuitry automatically decreases the values corresponding to the peaks and valleys of the signal in response to expiration of a predetermined amount of time indicated by the timing signals, and a threshold detector coupled to the tracking circuitry for receiving the peak and valley values and the signal and for generating data in accordance therewith.

DESCRIPTION OF A PREFERRED EMBODIMENT

Figure 1:
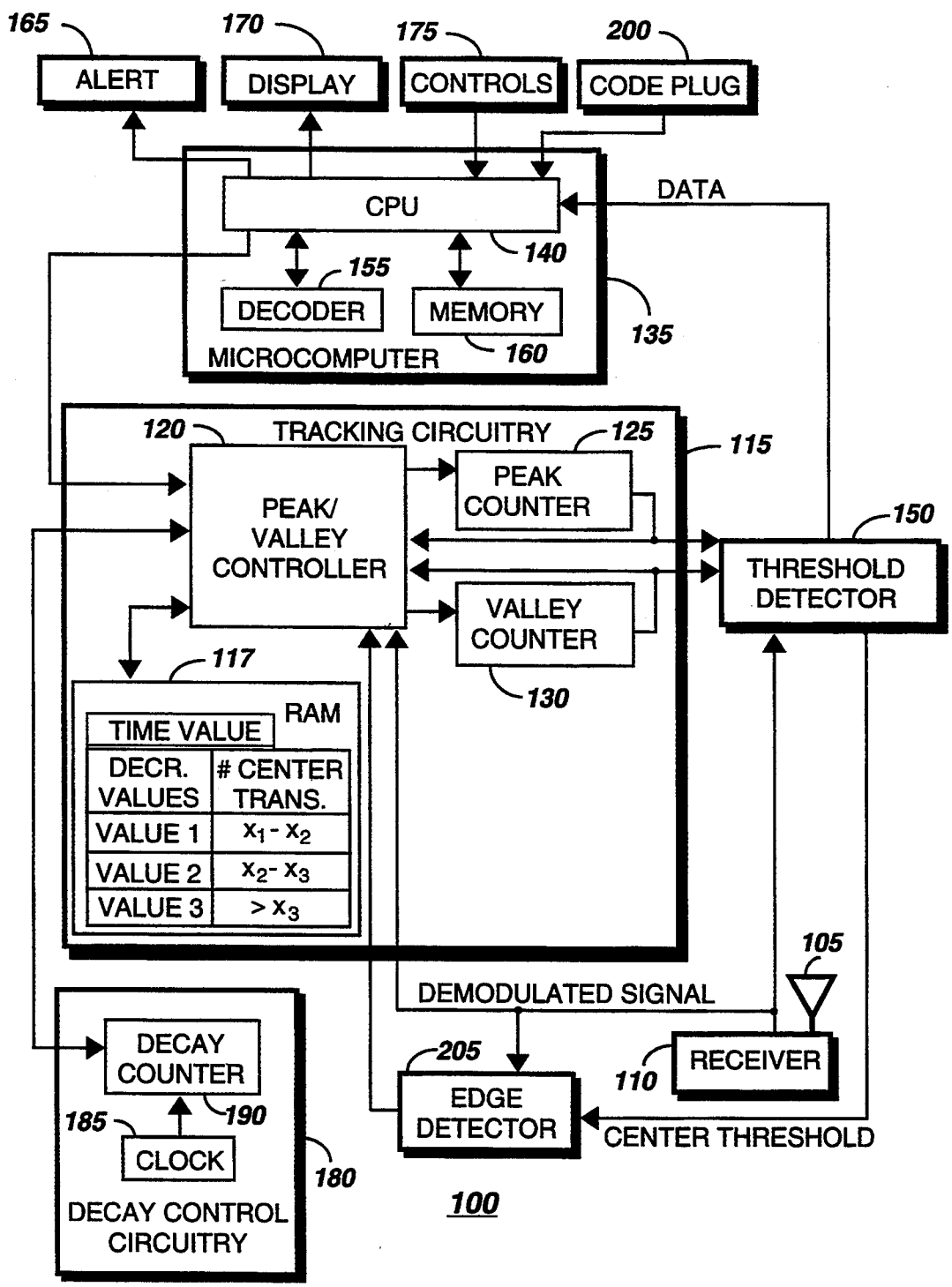
FIG. 1 is an electrical block diagram of a radio communication device in accordance with a preferred embodiment of the present invention.

With reference to FIG. 1, an electrical block diagram of a radio communication device 100 is depicted. According to the present invention, the radio communication device 100 comprises an antenna 105 for receiving a radio frequency signal and a receiver 110 coupled to the antenna 105 for demodulating the radio frequency signal. The demodulated signal is thereafter provided to tracking circuitry 115, which processes the signal to acquire peaks and valleys, i.e., highs and lows, of the signal for subsequent use in generating digital data. The tracking circuitry 115 preferably comprises a controller 120 and peak and valley counters 125, 130 coupled to and controlled by a controller 120. The peak and valley counters 125, 130 store values corresponding to the signal peaks and valleys as directed by the controller 120. Further included in the tracking circuitry 115 is a memory, such as a random access memory (RAM) 117, for storing a time value and decrement values for operation of the tracking circuitry 115.

The radio communication device 100 further comprises processing circuitry for controlling the operation of the radio communication device 100. Preferably, the processing circuitry is a microcomputer 135, such as an MC68HC05 microcomputer manufactured by Motorola, Inc. of Schaumburg, Ill., although it may be appreciated that the processing circuitry may be implemented through the use of hard-wired logic capable of performing the same operations.

The microcomputer 135 includes a central processing unit (CPU) 140, which controls the microcomputer 135 and provides mode control signals to the controller 120. The CPU 140 is able to place the controller 120 in three different modes, usually referred to as "track", "reset", and "hold". When the controller 120 is set in the "reset" mode, typically after power up of the radio communication device 100, the peak and valley values stored in the counters 125, 130 are reset to an initial value, such as zero. Thereafter, when the controller 120 is set in the "track" mode, the controller increments and decrements the values stored in the counters 125, 130 to track the demodulated signal. When a desired signal is recognized by the CPU 140 and the controller 120 is placed in the "hold" mode, the peak and valley values are set in the peak and valley counters 125, 130.

According to the present invention, a threshold detector 150 generates digital data from the demodulated signal in accordance with the peak and valley values. The threshold detector 150 utilizes the peak and valley values to determine a center threshold, i.e., center point, of the signal. In two-level signalling applications, signal levels of the demodulated signal which are above the center threshold are recognized as being digital one's, and signal levels which are below the center threshold are recognized as being digital zero's. It may be appreciated, furthermore, that the threshold detector 150 may generate, in a manner well known to one of ordinary skill in the art, digital data in multi-level signalling schemes as well. The threshold detector 150 thereafter provides the digital data to the CPU 140.

The CPU 140 subsequently provides the digital data to a decoder 155, which is also internal to the microcomputer 135. The decoder 155 decodes the data to recover information, e.g., selective call message information, which is stored in a memory 160 coupled to the CPU 140. The CPU 140 may then provide an activation signal to an alert mechanism 165, such as a transducer, which, in response thereto, generates an audible alert to announce to a user that selective call message information has been received. The selective call message information may be displayed to the user on a display device 170 either automatically or in response to user manipulation of controls 175, which are accessible from the exterior of the radio communication device 100.

The CPU 140 can receive data from the threshold detector 150 while the controller 120 is operating in the "track" mode or the "hold" mold. Until the data is recognized by the CPU 140 as being received correctly, the controller 120 generally continues to track the incoming signal. As mentioned above, when in the "track" mode, the controller 120 is able to both increment and decrement the peak and valley counters 125, 130. Furthermore, according to the present invention, the controller 120 can automatically decrement the counters 125, 130 independent of reception of directions from the microcomputer 135. This is accomplished through the use of decay control circuitry 180 coupled to the tracking circuitry 115.

In accordance with the preferred embodiment of the present invention, the decay control circuitry 180 controls the automatic decay of the tracking circuitry 115, i.e., the automatic decrementing of the peak and valley counters 125, 130. Preferably, the decay control circuitry 180 comprises a clock 185 for generating period timing signals, or pulses, which are counted by a decay counter 190. The decay counter 190 is incremented for every pulse of the clock 185 until reset by the controller 120. When the controller 120 recognizes that the value stored in the decay counter 190 is equivalent to the time value stored in the RAM 117, the controller 120 automatically decrements the peak and valley counters 125, 130.

It may be appreciated that the decay control circuitry 180, when implemented in hardware as shown, is extremely fast and does not require the interaction of the microcomputer 135. In conventional radio communication devices, on the other hand, a microcomputer typically performs subroutines stored in memory before directing tracking circuitry to decay, i.e., track a converging signal. Therefore, because the decay control circuitry 180 is preferably configured in hardware, space in the memory 160 is saved. This is very desirable in smaller radio communication devices, such as paging receivers, in which memory space is usually limited.

Additionally, the time value stored in the RAM 117 can be conveniently specified by a user through use of a programmable memory, such as a code plug 200 coupled to the CPU 140. The user may, for example, program the time value such that the peak and valley counters 125, 130 are decremented every symbol time or a multiple of the symbol time, which can be especially useful for situations in which the radio communication device 100 is relocated between different systems having different data rates. The time value is then provided by the CPU 140 to the controller 120, which preferably stores the time value in the RAM 117, where it may be quickly accessed.

Additionally, according to the present invention, a number of possible values by which the counters 125, 130 can be decremented may be programmed by the user into the code plug 200 for transfer to the RAM 117. These decrement values are utilized by the controller 120 to adjust the decay rate, i.e., the rate at which a converging signal is tracked, of the tracking circuitry 115. As described above, the threshold detector 150 generates a center threshold of the signal as well as the digital data. The center threshold is provided to an edge detector 205, which counts the number of center transitions, i.e., the number of time the signal crosses the center threshold, occurring within a predetermined amount of time, such as a symbol time. The controller 120 utilizes the number of center transitions to determine which of the possible decrement values should be used to decrement the peak and valley counters 125, 130.

By way of example, if the number of center transitions exceeds a predetermined number (such as five center transitions), indicating that an undesired signal, such as a noisy signal which is fluctuating rapidly, is being received, the controller 120 preferably selects and retrieves a large decrement value for use in decrementing the counters 125, 130 to capture the signal more quickly. Conversely, if the number of center transitions indicates that a desired signal is present, the controller 120 may retrieve a smaller decrement value to slow down the decay rate and thereby prevent small signal fluctuations from affecting the peak and valley values. In this manner, the decay rate, which is determined by the amount by which the peak and valley counters 125, 130 are decremented, can be conveniently varied without input from the microcomputer 135.

Figure 2:
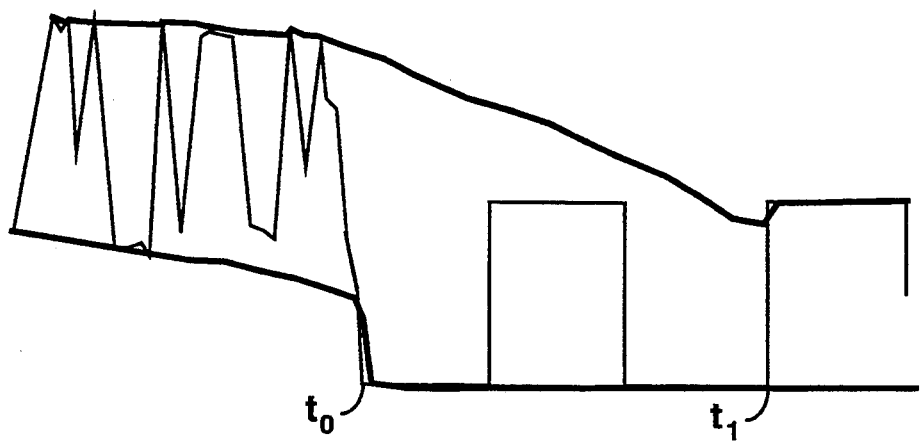
FIG. 2 is a signal diagram of the tracking of a signal by conventional analog tracking circuitry included in a conventional radio communication device.

Referring next to FIG. 2, a signal diagram depicts the tracking of a demodulated signal by a conventional radio communication device utilizing analog tracking circuitry. As shown, the tracking circuitry tracks the signal at a very slow decay rate, determined by a fixed capacitive value, when the signal voltage decreases. Therefore, When the signal transitions from noise to a desired signal, at time $t_0$, the tracking circuitry is unable to acquire the peaks and valleys of the desired signal at the transition time. Information included in the beginning of the desired signal is missed, as a result, until the peaks and valleys are acquired at time $t_1$. By way of example, if, in a system utilizing the POCSAG (Post Office Code Standardization Advisory Group) signalling format, the code synchronization word, which is transmitted at the beginning of a batch of data, is not tracked by the tracking circuitry, the code word is not recognized by the radio communication device. This results in the radio communication device having to wait until transmission of a subsequent batch of data for reception of selective call message information.

Figure 3:
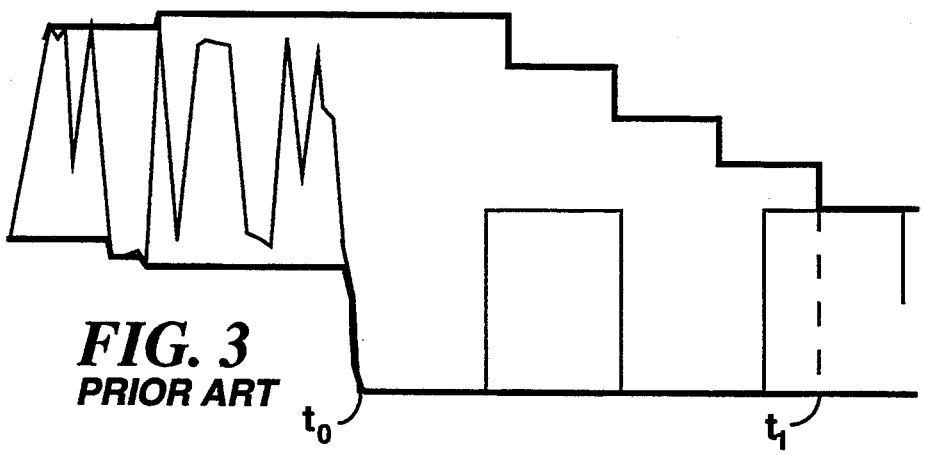
FIG. 3 is a signal diagram of the tracking of a signal by conventional digital tracking circuitry included within a conventional radio communication device.

Referring next to FIG. 3, a signal diagram illustrates the tracking of a demodulated signal in a conventional radio communication device utilizing conventional digital tracking circuitry. In such a device, the tracking circuitry automatically follows the highest peaks and lowest valleys of the signal, as shown, until a microcomputer directs the tracking circuitry to decay. As a result, similar to the analog tracking circuitry, the beginning of a desired signal may be easily missed. A further disadvantage of this type of tracking circuitry is that subroutines directing the microcomputer to issue decrement commands must be stored in a memory, such as a read only memory (ROM), in which space is usually at a premium. Additionally, time is wasted during which the microcomputer retrieves information from the memory, processes the information, and issues the appropriate commands to the tracking circuitry.

However, the conventional digital tracking circuitry has the advantage that peak and valley values can be set by the tracking circuitry for use in data generation when the tracking circuitry is in the "hold" mode. For instance, in the POCSAG signalling formats, the conventional radio communication device is able to determine, in a manner well known to one of ordinary skill in the art, that data has been received correctly when a code synchronization word has been completely recovered. Thereafter, the tracking circuitry is directed to "hold" the current peak and valley values. As a result, subsequent noise spikes or other variations do not affect the generated data.

Figure 4:
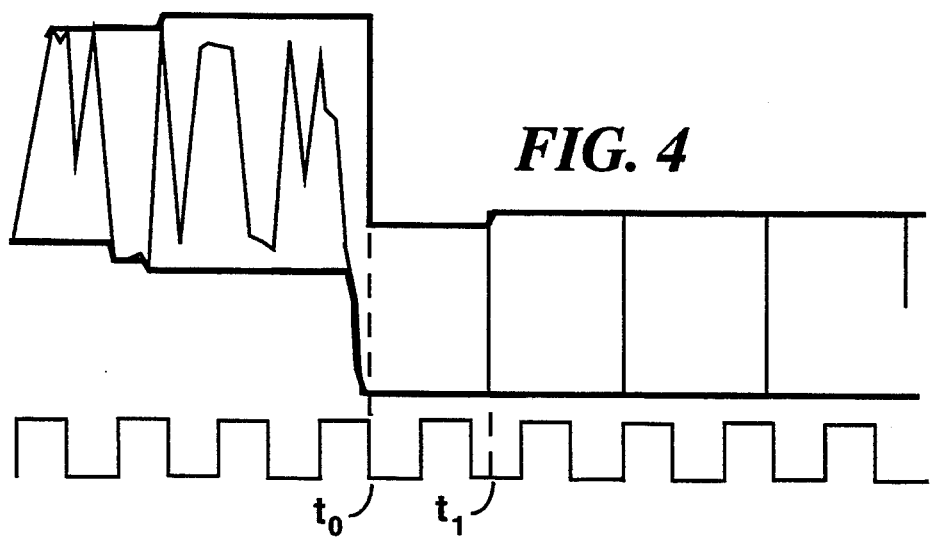
FIG. 4 is a signal diagram of the tracking of a signal by tracking circuitry included within the radio communication device of FIG. 1 in accordance with the preferred embodiment of the present invention.

The radio communication device 100 (FIG. 1) also includes tracking circuitry 115 which has the ability to hold desired peak and valley settings. Additionally, in accordance with the preferred embodiment of the present invention, the tracking circuitry 115 is able to decrement the peak and valley counters 125, 130 automatically without input from the microcomputer 135. This process is shown in FIG. 4, which is a signal diagram illustrating the tracking of a demodulated signal according to the present invention. As shown in this example, the time value in the RAM 117 is set such that the controller 120 begins the decay process after four clock pulses. At this time, $t_0$, the controller 120 decrements the peak value in the peak counter 125 by the appropriate decrement value stored in the RAM 117. Preferably, because the number of center transitions at this time indicate the presence of a noisy signal, the decrement value is large, thereby increasing the decay rate. Thereafter, at $t_1$, the peak value is incremented to a value associated with the peak of the desired signal. In this manner, the entire signal is received, and situations are advantageously eliminated in which the beginning portion of the desired signal is missed. As a result, data generated by the radio communication device 100 may be more accurately and quickly decoded than data generated by conventional radio communication devices.

Figure 5:
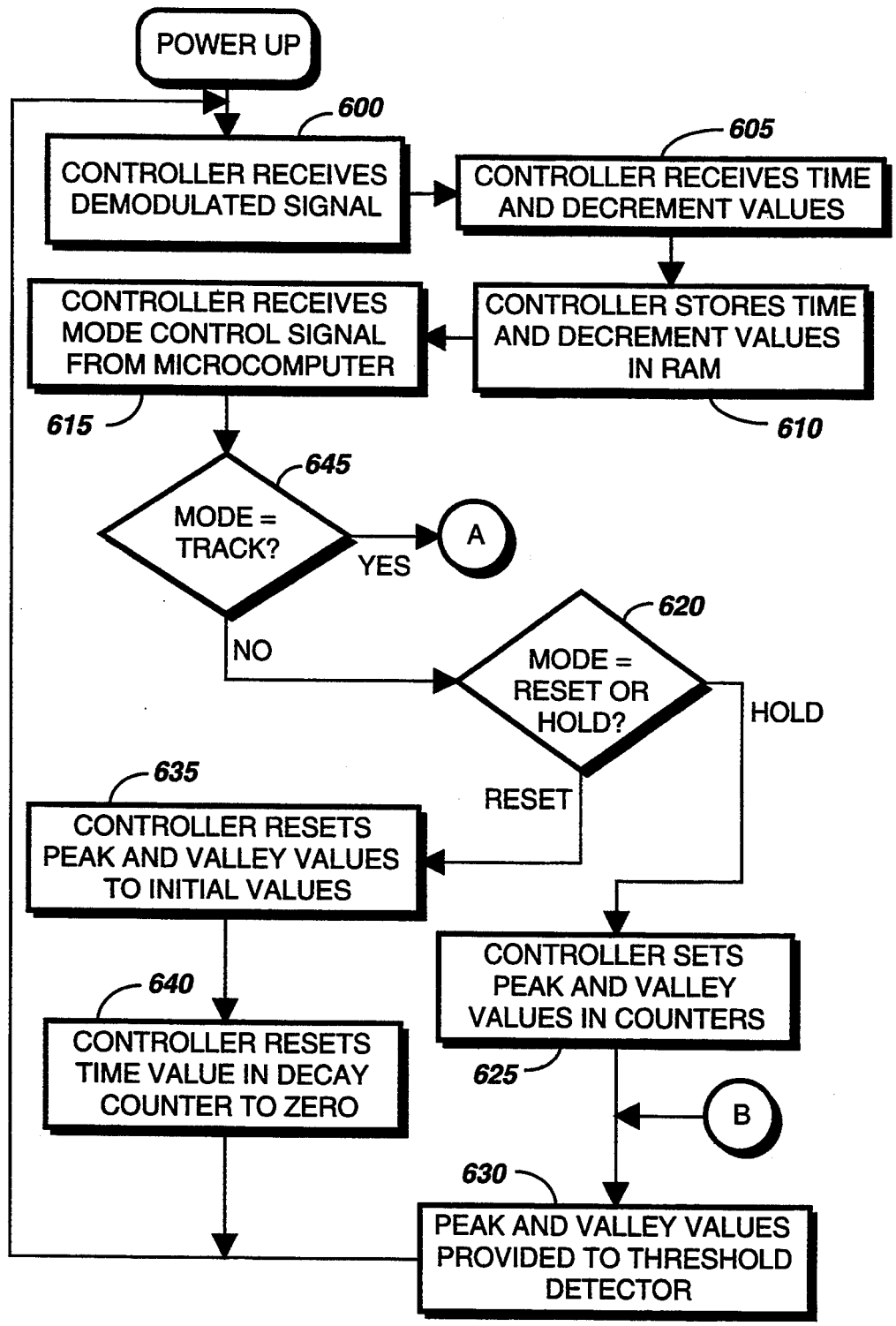
FIGS. 5 and 6 are flowcharts depicting the operation of the tracking circuitry of FIG. 1 in accordance with the preferred embodiment of the present invention.
Figure 6:
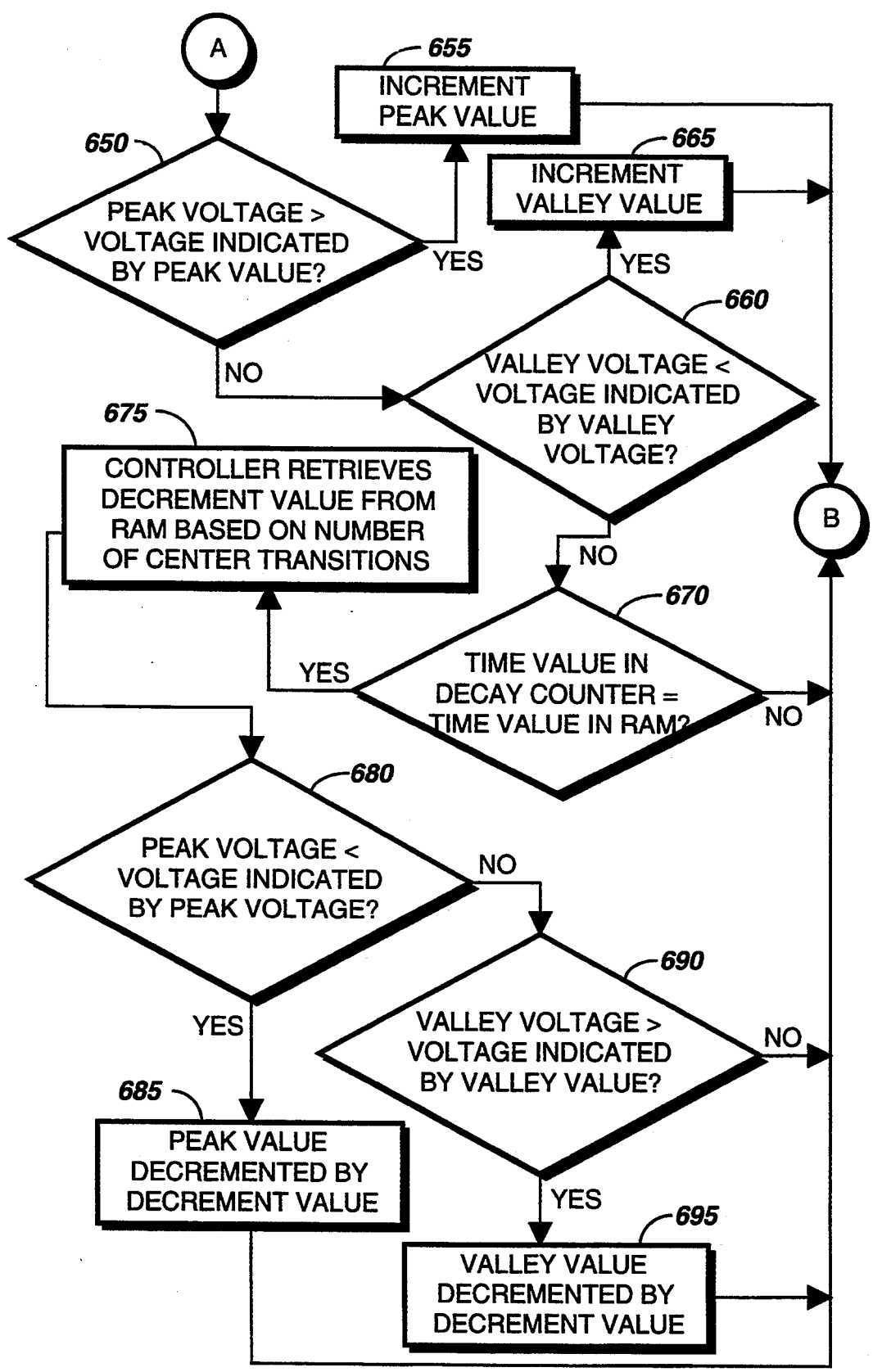

Referring next to FIGS. 5 and 6, a flowchart depicts the operation of the tracking circuitry 115 included within the radio communication device 100 (FIG. 1 ). In accordance with the preferred embodiment of the present invention, the controller 120 receives, at step 600, the demodulated signal from the receiver 110 upon powering up the radio communication device 100. The controller 120 further receives, at step 605, the previously programmed time and decrement values, which are stored, at step 610, in the RAM 117. Additionally, the controller 120 receives, at step 615, a mode control signal generated by the CPU 140.

When the CPU 140 places, at step 620, the controller 120 in the "hold" mode, the peak and valley values currently stored in the peak and valley counters 125, 130 are set, at step 625, and thereafter provided, at step 630, to the threshold detector 150. As described above, the threshold detector 150 utilizes the peak and valley values to generate digital data from the demodulated signal.

When the CPU 140 places, at step 620, the controller 120 in the "reset" mode, which typically occurs at power up, the controller 120 resets, at step 635, the peak and valley values to initial values, such as zero. Additionally, the controller 120 resets, at step 640, the time value stored in the decay counter 190 (FIG. 1) to zero.

When in the "track" mode, at step 645, the controller 120 determines the voltages of the signal peaks and valleys in a manner well known to one of ordinary skill in the art. In response to determining, at step 650, that the peak voltage is greater than the voltage indicated by the stored peak value, the peak counter 125 is incremented at step 655. Similarly, in response to determining, at step 660, that the valley voltage is less than the voltage indicated by the stored valley value, the valley counter 130 is incremented at step 665. The incremented values are then provided, at step 630, to the threshold detector 150.

When, at step 670, the time value set in the decay counter 190, i.e., the number of clock pulses, is equivalent to the time value stored in the RAM 117, the controller 120 retrieves, at step 675, an appropriate decrement value from the RAM 117 in accordance with the number of center transitions. This may be done, for example, by comparing the number of center transitions provided by the edge detector 205 with stored, predetermined numbers to determine which of corresponding decrement values is to be retrieved. In this manner, as mentioned above, the controller 120 might retrieve a larger decrement value when the number of center transitions is indicative of a noisy signal and a smaller decrement value when a desired signal is present. Therefore, the decay rate, which is directly determined by the decrement value, can be simply and conveniently varied to ensure the accurate generation of digital data from the demodulated signal.

Thereafter, when, at step 680, the peak signal voltage is less than the voltage indicated by the peak value in the peak counter 125, the controller 120 automatically decrements, at step 685, the peak value by the decrement value. Similarly, when, at step 690, the valley signal voltage is greater than the voltage indicated by the valley value, the valley value is decremented, at step 695, by the decrement value. The peak and valley values stored in the counters 125, 130 are subsequently provided, at step 630, to the threshold detector 150.

In summary, the radio communication device according to the present invention includes tracking circuitry which is able to automatically decay to track the peaks and valleys of a converging signal. This automatic decay is preferably implemented in hardware, e.g., a clock and a counter. As a result, the hardware implementation is extremely fast and requires no interaction with processing circuitry, such as a microcomputer for controlling the radio communication device. Additionally, the automatic decay, which is periodic, may be easily adjusted by a user. The adjustment may be made, for example, by programming a code plug included in the radio communication device.

Furthermore, in accordance with the preferred embodiment of the present invention, the decay rate, i.e., the rate at which a converging signal can be tracked, can be advantageously varied to more accurately track the peaks and valleys of a signal. Preferably, the decay rate of the tracking circuitry is increased during reception of a noisy signal and decreased when a desired signal is present. Therefore, when the signal transitions from noise to a desired signal, the relatively fast decay rate allows the rapid capture of peaks and valleys of the desired signal, thus preventing situations in which portions of a desired signal are missed. When the desired signal is recognized, the decay rate may be slowed to more accurately track the peaks and valleys of the signal and prevent small signal variations from affecting the generated data.

It may be appreciated by now that there has been provided a method for tracking signal peaks and valleys that provides for the more accurate generation of digital data. Additionally, the method is faster than conventional signal tracking methods and does not require that space-consuming subroutines be stored in memory.

We claim:

1. A method for tracking a received signal, the method comprising the steps of:
    (a) setting a counter to a first value indicative of a first signal voltage;
    (b) determining a center threshold of the received signal;
    (c) determining a number of center transitions of the received signal within a predetermined time period; and
    (d) automatically decrementing the counter to a second value indicative of a second signal voltage in response to expiration of a predetermined amount of time, wherein the second value differs from the first value by a predetermined amount determined by the number of center transitions of the received signal within the predetermined time period.

2. The method according to claim 1, wherein step (d) comprises the steps of:
    (e) automatically decrementing the counter to the second value, wherein the second value differs from the first value by a first amount when the number of center transitions is greater than a predetermined number of center transitions; and
    (f) automatically decrementing the counter to the second value, wherein the second value differs from the first value by a second amount when the number of center transitions is less than the predetermined number of center transitions.

3. A method, in a radio communication device, for digitally tracking peaks and valleys of a radio frequency (RF) signal, the method comprising the steps of:
    (a) setting a counter to a first value indicative of a first signal voltage;
    (b) incrementing the counter when a signal peak increases in voltage;
    (c) determining a center threshold of the signal;
    (d) determining a number of center transitions of the signal within a predetermined time period; and
    (e) automatically decrementing the counter in accordance with the number of center transitions within the predetermined time period when the signal peak decreases in voltage.

4. The method according to claim 3, wherein step (e) comprises the steps of:
    (f) automatically decrementing the counter to a second value in response to determining that the number of center transitions is greater than a predetermined number of center transitions; and
    (g) automatically decrementing the counter to a third value in response to determining that the number of center transitions is greater than the predetermined number of center transitions, wherein the difference between the first and second values is greater than the difference between the first and third values.

5. A radio communication device for receiving and demodulating a radio frequency (RF) signal, the radio communication device comprising:
    tracking circuitry for tracking the signal to acquire values corresponding to peaks and valleys of the signal, the tracking circuitry comprising a peak counter for storing a peak value, a valley counter for storing a valley value, a controller coupled to and controlling the peak and valley counters, and a memory coupled to the controller for storing a time value associated with the predetermined amount of time;
    decay control circuitry coupled to the tracking circuitry for generating timing signals, wherein the tracking circuitry automatically decreases the values corresponding to the peaks and valleys of the signal in response to expiration of a predetermined amount of time indicated by the timing signals; and a threshold detector coupled to the tracking circuitry for receiving the peak and valley values and the signal and for generating data in accordance therewith.

6. The radio communication device according to claim 5, wherein the memory further stores a decrement value, and wherein the controller decrements the peak and valley values by the decrement value in response to expiration of the predetermined amount of time.

7. The radio communication device according to claim 5, wherein the decay control circuitry comprises:
   a clock for generating the timing signals; and
   a decay counter coupled to the clock and the controller for counting a number of timing signals.

8. The radio communication device according to claim 5, further comprising processing circuitry coupled to the threshold detector for processing the data to recover therefrom message information.

9. A radio communication device for receiving and digitally tracking a signal, the radio communication device comprising:
   a receiver for receiving and demodulating the signal;
   a threshold detector coupled to the receiver for determining a center threshold of the signal;
   an edge detector coupled to the receiver and the threshold detector for determining a number of center transitions of the signal within a predetermined time period;
   decay control circuitry for generating timing signals the decay control circuitry comprising a decay counter for counting a number of timing signals; and
   tracking circuitry coupled to the decay control circuitry and the receiver for acquiring signal peak and valley values, the tracking circuitry comprising:
   a peak counter coupled to the threshold detector for storing a peak value corresponding to a signal peak;
   a valley counter coupled to the threshold detector for storing a valley value corresponding to a signal valley;
   a memory coupled to the peak and valley counters for storing a time value;
   a controller coupled to and controlling the peak and valley counters and coupled to the decay control circuitry for automatically decrementing the peak and valley values in response to determining that the number of timing signals indicated by the decay counter is equivalent to the time value stored in the memory, wherein the peak and valley values are decremented by a selected one of first and second decrement values, and the selected one of the first and second decrement values is selected by the controller in accordance with the number of center transitions.

10. The data communication receiver according to claim 9, wherein:
    the threshold detector further generates data in accordance with the signal and the peak and valley values; and
    the radio communication device further comprises processing circuitry coupled to the threshold detector for processing the data to recover therefrom message information.

11. The radio communication device according to claim 10, further comprising a display coupled to the processing circuitry for displaying the message information.

* * * * *